US006553670B2

(12) United States Patent
Chang

(10) Patent No.: US 6,553,670 B2

(45) Date of Patent: Apr. 29, 2003

(54) PLASTIC PIPE CUTTER

(76) Inventor: Ching-Tsung Chang, No. 83, Lane 341, Sher-Ten Rd., U-Ryh Village, Taichung County (TW)

( * ) Notice: Subject to any disclaimer, the term of this patent is extended or adjusted under 35 U.S.C. 154(b) by 7 days.

(21) Appl. No.: 09/753,948

(22) Filed: Jan. 2, 2001

(65) Prior Publication Data

US 2002/0083593 A1 Jul. 4, 2002

(51) Int. Cl.[7] .......................... B23D 21/06; B26B 17/00

(52) U.S. Cl. ............................................. 30/92; 30/182

(58) Field of Search ........................... 30/92, 212, 241, 30/242, 243, 182, 183, 185, 335

(56) References Cited

U.S. PATENT DOCUMENTS 4,009,804 A * 3/1977 Costa et al. ................ 222/391
5,070,616 A * 12/1991 Chen ........................... 30/180
5,862,593 A * 1/1999 Huang ......................... 30/182
6,056,156 A * 5/2000 Peng .......................... 222/326

* cited by examiner

*Primary Examiner*—Allan N. Shoap
*Assistant Examiner*—Isaac N Hamilton
(74) *Attorney, Agent, or Firm*—Bacon & Thomas, PLLC

(57) ABSTRACT

A plastic pipe cutter. The cutter includes a front recess for clamping a workpeice, a front chamber, a rear chamber in communication with the front chamber, a bar shaped cutting device including a front blade, a rear head, and a central shank extended through the front chamber and the rear chamber. A first assembly in the front chamber includes a stop plate having a hole with the shank passed therethrough. An activation member having a hole larger than the diameter of the shank with the shank passed therethrough. A first resilient member is put on the shank and biased between the stop plate and the activation member. A pivotal trigger with the top thereof is engaged with the activation member. A second assembly in the rear chamber includes a pivotal engagement member and a second resilient member put on the shank and biased between the engagement member and the inner wall of the rear chamber. A third resilient member is put on the shank and biased between the enlarged head and the rear of the cutter.

4 Claims, 5 Drawing Sheets

PLASTIC PIPE CUTTER

FIELD OF THE INVENTION

The present invention relates to cutters and more particularly to a plastic pipe (e.g., PVC pipe) cutter with enhanced safety and convenience features.

BACKGROUND OF THE INVENTION

Conventionally, user uses a saw to cut a plastic pipe (e.g., PVC pipe) which is placed on a supporting ground or stand. It is known that a PVC pipe substantially has a smooth surface and a predetermined hardness. Hence, PVC pipe tends to slide with respect to the saw and/or the saw tends to move away from the desired cutting position on PVC pipe. This may cause a number of problems. For example, user may be hurt by the saw carelessly. Further, the operating speed is slow. Furthermore, the finished pipe is not aesthetically pleasing.

Thus, it is desirable to provide a new and improved plastic pipe cutter in order to overcome the above drawbacks of prior art.

SUMMARY OF THE INVENTION

It is an object of the present invention to provide a plastic pipe cutter comprising a front recess for clamping a workpiece; a front chamber in the rear of the recess; a rear chamber in communication with the front chamber; a substantially elongate bar shaped cutting device including a front blade, a rear enlarged head, and a shank coupled between the blade and the enlarged head, the shank being extended through the front chamber and the rear chamber to project beyond the rear of the cutter; a first assembly disposed in the front chamber, the first assembly including a stop plate having a hole with the shank passed through, an activation member having a hole larger than the diameter of the shank with the shank passed through, a first elastic or resilient member put on the shank and biased between the stop plate and the activation member; a trigger pivotably secured to the lower portion of the cutter by a pin adjacent the activation member, the top of the trigger being engaged with the lower portion of the activation member; a second assembly disposed in the rear chamber, the second assembly including an engagement member and a second elastic or resilient member put on the shank and biased between the engagement member and the inner wail of the rear chamber, the engagement member having a hole larger than the diameter of the shank with the shank passed through and a pin on the top for pivotably securing to the cutter, the lower portion of the engagement member being projected downwardly from the cutter, the engagement member being obliquely disposed such that the edges of the hole of the engagement member are in contact with the shank in a storage position; and a third elastic or resilient member put on the shank and biased between the enlarged head and the rear of the cutter. By continuing to grip and subsequently release the trigger, it is possible to push the blade toward the recess to cut a workpiece.

The above and other objects, features and advantages of the present invention will become apparent from the following detailed description taken with the accompanying drawings.

DETAILED DESCRIPTION OF THE PREFERRED EMBODIMENTS

Figure 1:
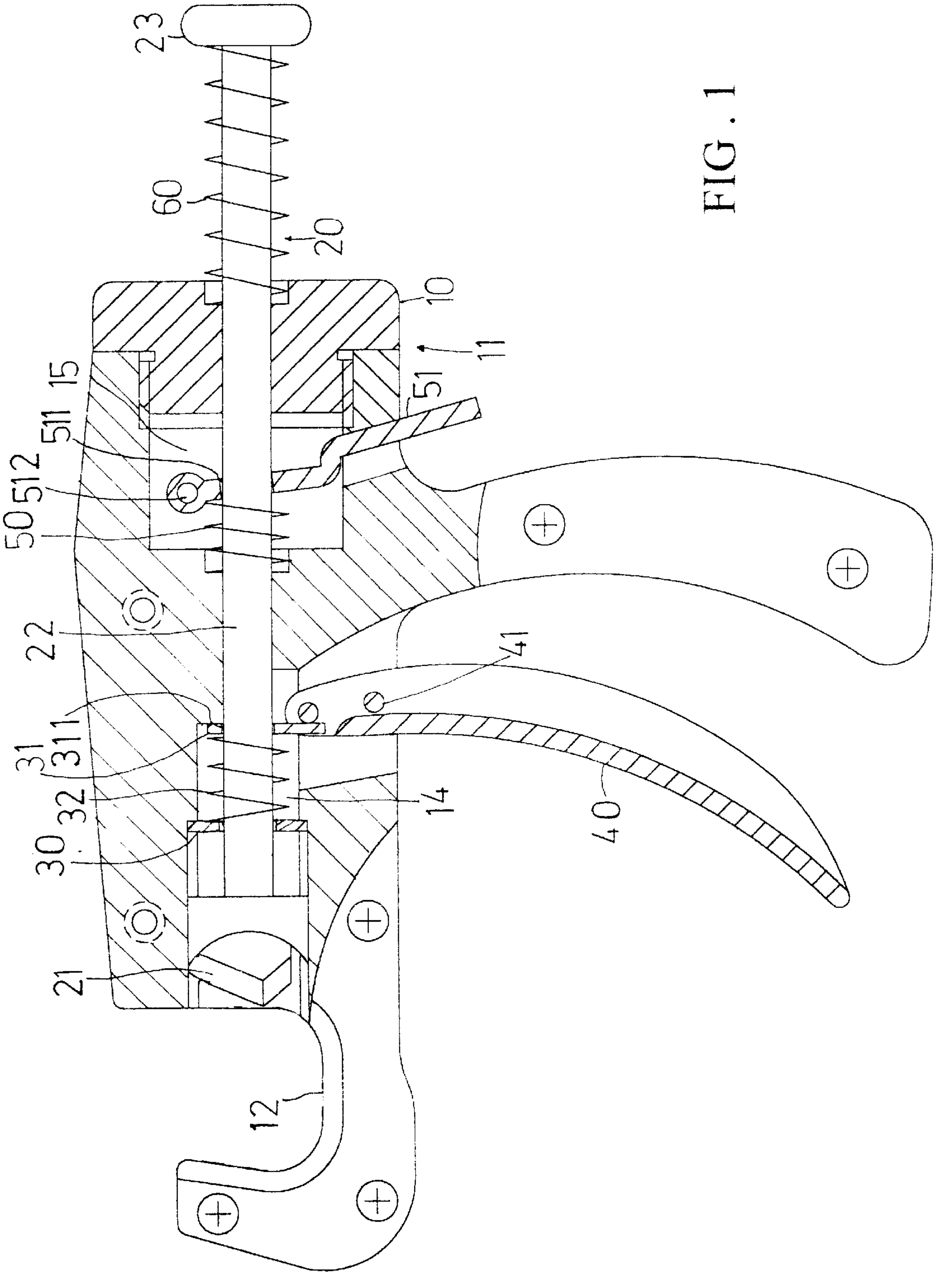
FIG. 1 is a side view in part section of a first preferred embodiment of plastic pipe cutter according to the invention.

Referring to FIG. 1, there is shown a plastic pipe cutter constructed in accordance with the invention comprising a body 11 consisting of two identical housings 10. A recess 12 is formed at the front of body 11 for clamping a workpiece (e.g., PVC pipe not shown). A front chamber 14 in the rear of the recess 12 and a rear chamber 15 in communication with front chamber 14 are formed within body 11. A substantially elongate bar shaped cutting device 20 comprises a front blade 21, a rear enlarged head 23, and a shank 22 coupled between blade 21 and enlarged head 23. Shank 22 is extended through front chamber 14 and rear chamber 15 to project beyond the rear of body 11. Within front chamber 14, there is provided a stop plate 30 having a central hole with shank 22 passed through, an activation member 31 having a central hole 311 larger than the diameter of shank 22 with shank 22 passed through, and a first elastic member 32 put on shank 22 and biased between stop plate 30 and activation member 31. Trigger 40 is pivotably secured to the lower portion of body 11 by a pin 41 adjacent activation member 31. The top of trigger 40 is engaged with the lower portion of activation member 31. Within rear chamber 15, there is provided an engagement member 51 and a second elastic member 50 put on shank 22 and biased between engagement member 51 and the inner wall of rear chamber 15 wherein the engagement member 51 has a hole 511 larger than the diameter of shank 22 with shank 11 passed through and a pin 512 on the top for pivotably securing to body 111. The lower portion of engagement member 51 is projected downwardly from the body 11. Also, in a storage position, engagement member 51 is obliquely disposed such that the edges of hole 511 are in contact with shank 22. A third elastic member 60 is put on shank 22 and biased between enlarged head 23 and the rear of body 11.

Figure 2:
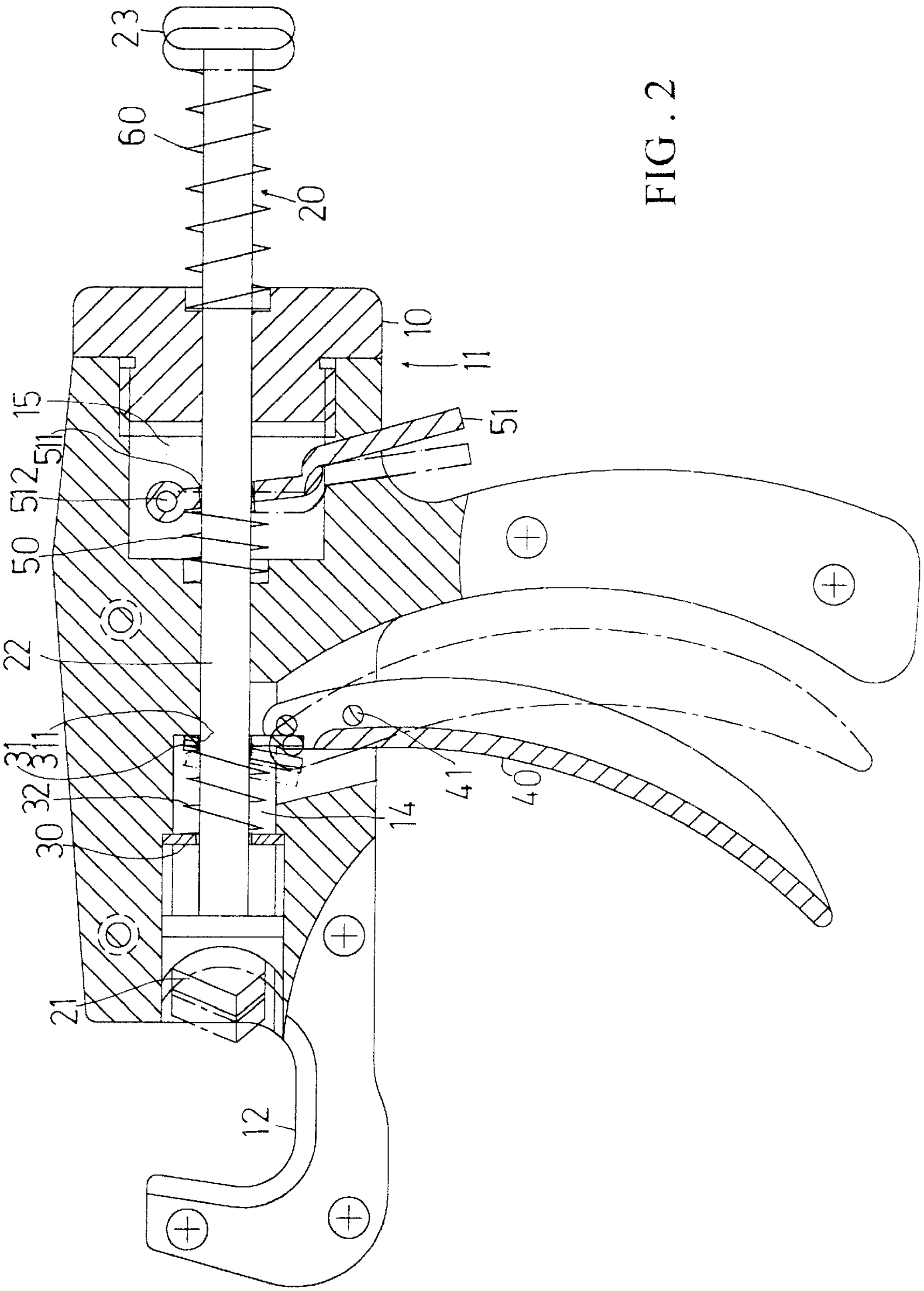
FIG. 2 is a view similar to FIG. 1 wherein the cutter is activating.
Figure 3:
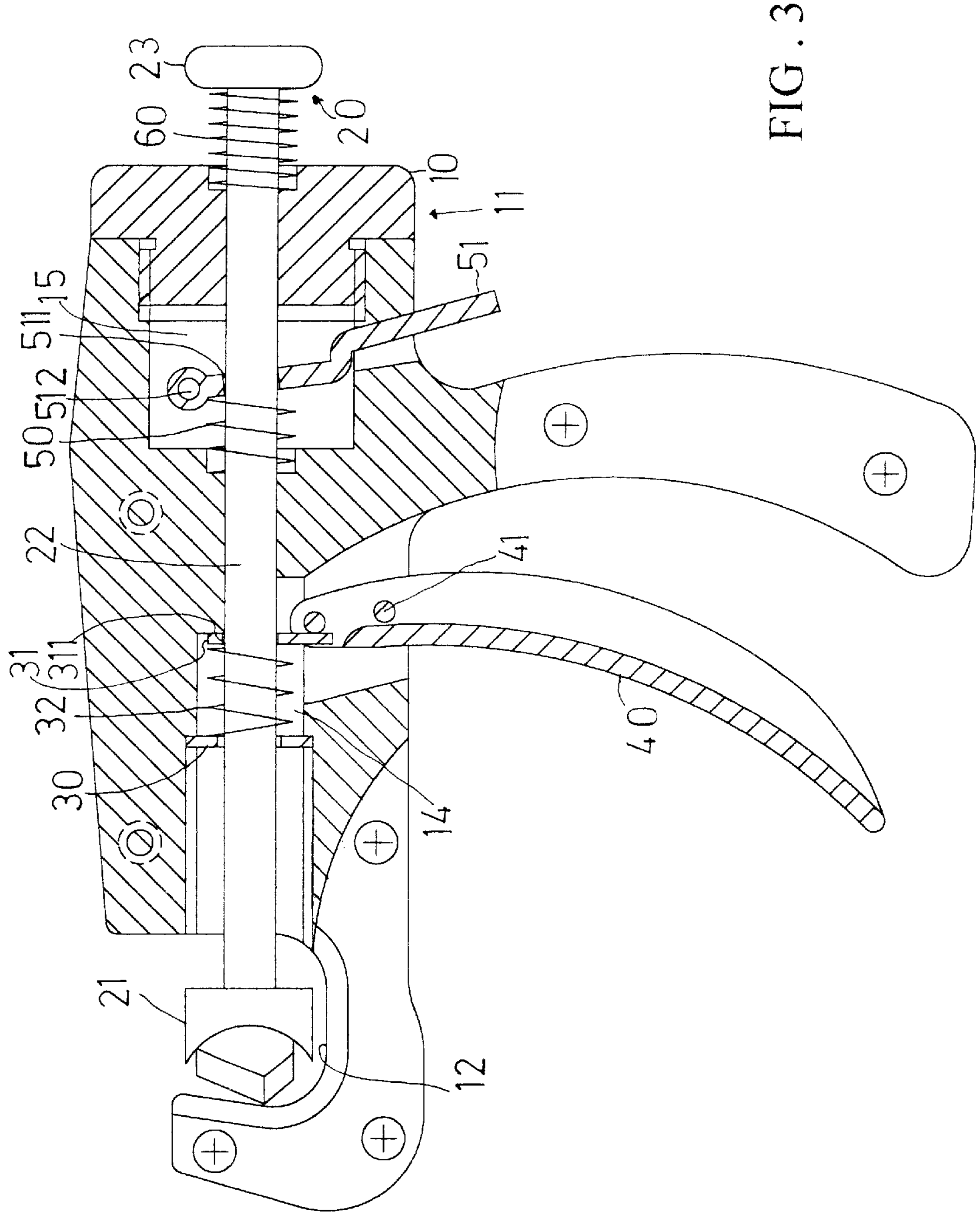
FIG. 3 is a view similar to FIG. 1 wherein the blade has been pushed to engage with and cut a workpiece.

The cutting operation of the invention will now be described in detail below by referring to FIGS. 2 and 3. First grip trigger 40 to cause it to pivot about pin 41. Then the upper portion of trigger 40 is pivoted forward to cause the lower portion of activation member 31 to pivot clockwise (i.e., activation member 31 is slanted as shown in FIG. 2). As such, the edges of hole 311 are in a tight contact with shank 22. Also, first elastic member 32 is compressed and in turn shank 22 is forced to move forward. At the same time, engagement member 51 is pivoted clockwise by the moving shank 22. Also, second elastic member 50 is compressed and in turn an allowance (i.e., gap) between the shank 22 and hole 511 is formed. Hence, shank 22 is easier to move. Further, third elastic member 60 is compressed by the enlarged head 23. When the gripping force on trigger 40 is released temporarily, the moving of shank 22 is halted. Then the engagement member 51 is pivoted counterclockwise by the expansion of second elastic member 50 to cause the edges of hole 511 to contact with shank 22 again, thereby holding shank 22 in place. Further, activation member 31 is pivoted counterclockwise by the expansion of first elastic member 32 to form an allowance (i.e., gap) between the shank 22 and hole 311. Hence, trigger 40 is pivoted counterclockwise to its original position by the also counterclockwise pivoted activation member 31. By repeating above operation, it is possible to push blade 21 toward recess 12 until engaging with and further cutting the workpiece.

Figure 4:
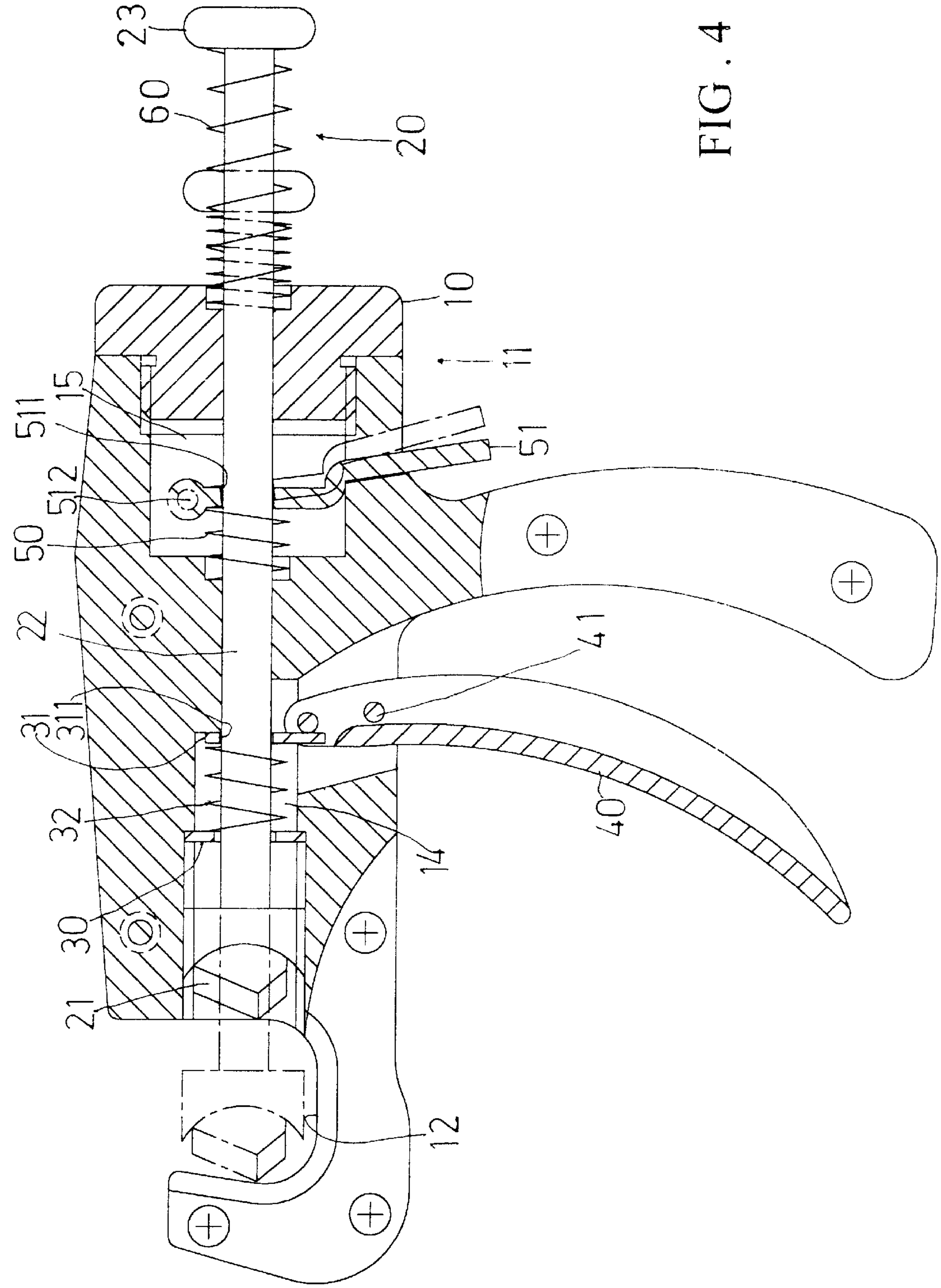
FIG. 4 is a view similar to FIG. 1 wherein the blade has been pulled to disengage from the workpiece after finishing cutting.

Referring to FIG. 4, after finishing cutting and removing the workpiece simply pivot trigger engagement member 51 counterclockwise to disengage hole 511 from shank 22 (i.e., a gap is formed between the shank 22 and hole 511). Hence, the compression force on third elastic member 60 is released and in turn enlarged head 23 is pushed outward by the expanding third elastic member 60 until back to the original position of enlarged head 23.

Figure 5:
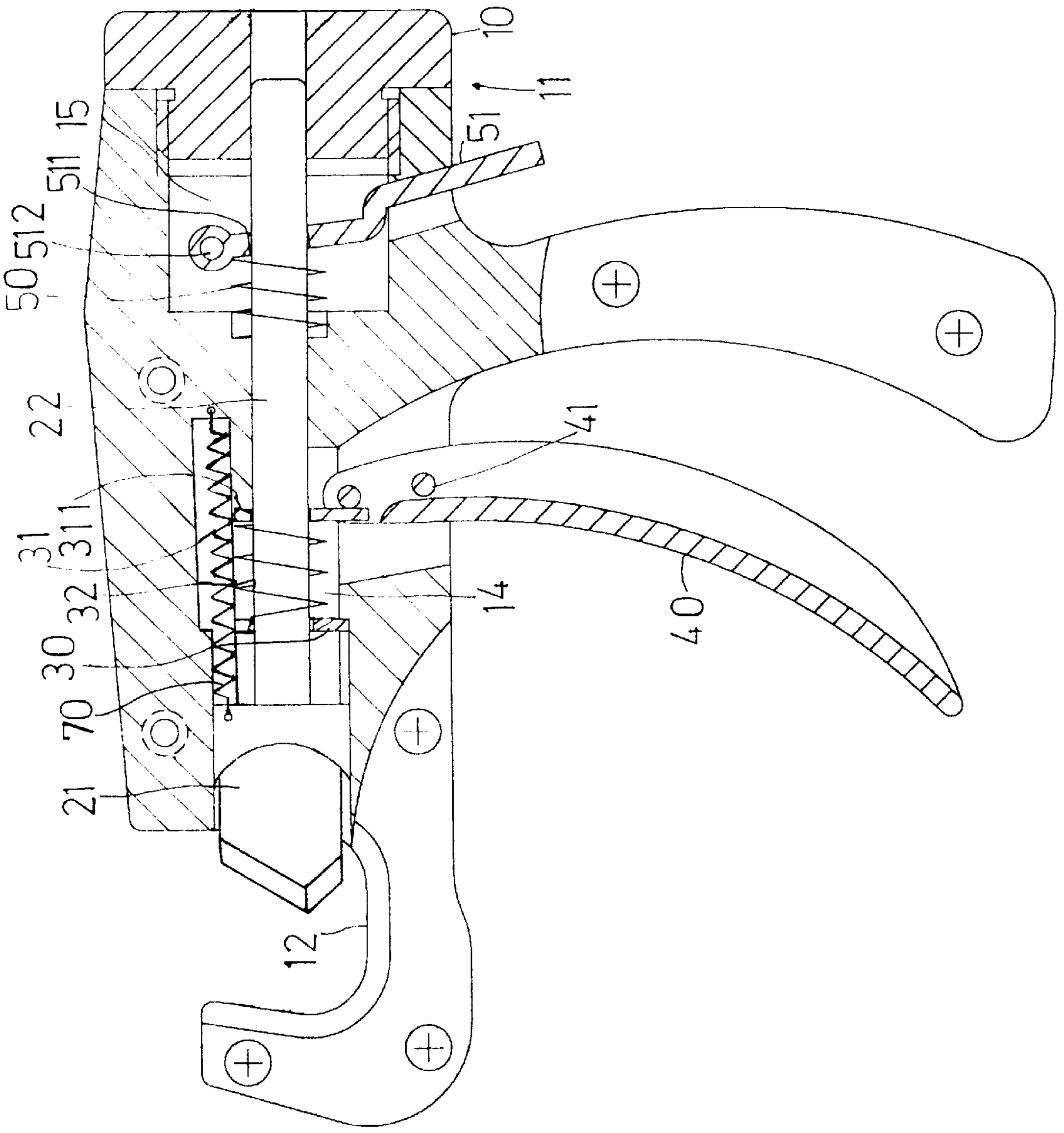
FIG. 5 is a side view in part section of a second preferred embodiment of plastic pipe cutter according to the invention.

Referring to FIG. 5, a second embodiment of the invention is shown. It is noted that first, second, and third elastic members are helical springs in the first embodiment. But the third elastic member 60 is replaced by a fourth elastic member (e.g., expansion spring) 70. Fourth elastic member 70 is anchored in front chamber 14 and has one end secured to the rear of blade 21 and the other end secured to the inner wall of front chamber 14. The second embodiment has the same effect as the first one, The elastic members 32, 50, 60, 70 can also be referred to as resilient members.

While the invention has been described by means of specific embodiments, numerous modifications and variations could be made thereto by those skilled in the art without departing from the scope and spirit of the invention set forth in the claims.

What is claimed is:

1. A pipe cutter comprising:

an elongated housing having a forward end and a rearward end;

a front recess adjacent and rearwardly of said forward end and adapted for clamping a workpiece;

a front chamber rearwardly of said recess;

a rear chamber rearwardly of and spaced from and in communication with said front chamber;

an elongate, rod-shaped cutting device including a front blade, a rear enlarged head, and a shank coupled between said blade and said enlarged head, said shank being extended through said front chamber and said rear chamber to project beyond said elongated housing, said shank having a perimeter;

a first assembly in said front chamber, said first assembly including a stop plate having a hole with said shank passing therethrough, an activation member having a hole larger than said perimeter of said shank with said shank passing therethrough, a first resilient member located between said stop plate and said activation member and encompassing a forward portion of said shank;

a trigger pivotably secured to said housing by a pin adjacent said activation member, said trigger being engaged with said activation member spaced from said pin;

a second assembly in said rear chamber, said second assembly including an engagement member and a second resilient member and located between said engagement member and an inner wall of said rear chamber and encompassing a rearward portion of said shank, said engagement member having a hole larger than said perimeter of said shank with said shank passing therethrough and a pin pivotably secured to said housing, a lower portion of said engagement member projecting downwardly from said housing, said engagement member being obliquely disposed such that said engagement member is in contact with said shank in a storage position about the hole of said engagement member;

a third resilient member located between said enlarged head and said rearward end of said housing and encompassing said shank thereat; and whereby continually squeezing said trigger and subsequently releasing said trigger, causes said blade to operably push towards said recess to cut a workpiece.

2. The pipe cutter as claimed in claim 1, wherein each of said resilient members is a helical spring.

3. A pipe cutter comprising:

an elongated housing having a forward end and a rearward end;

a front recess adjacent and rearwardly of said forward end and adapted for clamping a workpiece;

a front chamber rearwardly of said recess;

a rear chamber rearwardly of and spaced from and in communication with said front chamber;

an elongate, rod-shaped cutting device including a front blade and a shank, said shank being extended through said front chamber and said rear chamber to project beyond said elongated housing, said shank having a perimeter;

a first assembly in said front chamber, said first assembly including a stop plate having a hole with said shank passing therethrough, an activation member having a hole larger than said perimeter of said shank, with said shank passing therethrough, a first resilient member located between said stop plate and said activation member and encompassing a forward portion of said shank;

a trigger pivotably secured to said housing by a pin adjacent said activation member, said trigger being engaged with said activation member spaced from said pin;

a second assembly in said rear chamber, said second assembly including an engagement member and a second resilient member and located between said engagement member and an inner wall of said rear chamber and encompassing a rearward portion of said shank, said engagement member having a hole larger than said perimeter of said shank with said shank passing therethrough and a pin pivotably secured to said housing, a lower portion of said engagement member projecting downwardly from said housing, said engagement member being obliquely disposed such that said engagement member is in contact with said shank in a storage position about the hole of said engagement member;

a third resilient member positioned in said front chamber between a rear portion of said blade and an inner wall of said front chamber and encompassing said shank thereat; and whereby continually squeezing said trigger and subsequently releasing said trigger, causes said blade to operably push towards said recess to cut a workpiece.

4. The pipe as claimed in claim 3, wherein each of said first and second resilient members is a helical spring, and said third elastic member is an expansion spring.

* * * * *